United States Patent Office 3,505,867
Patented Apr. 14, 1970

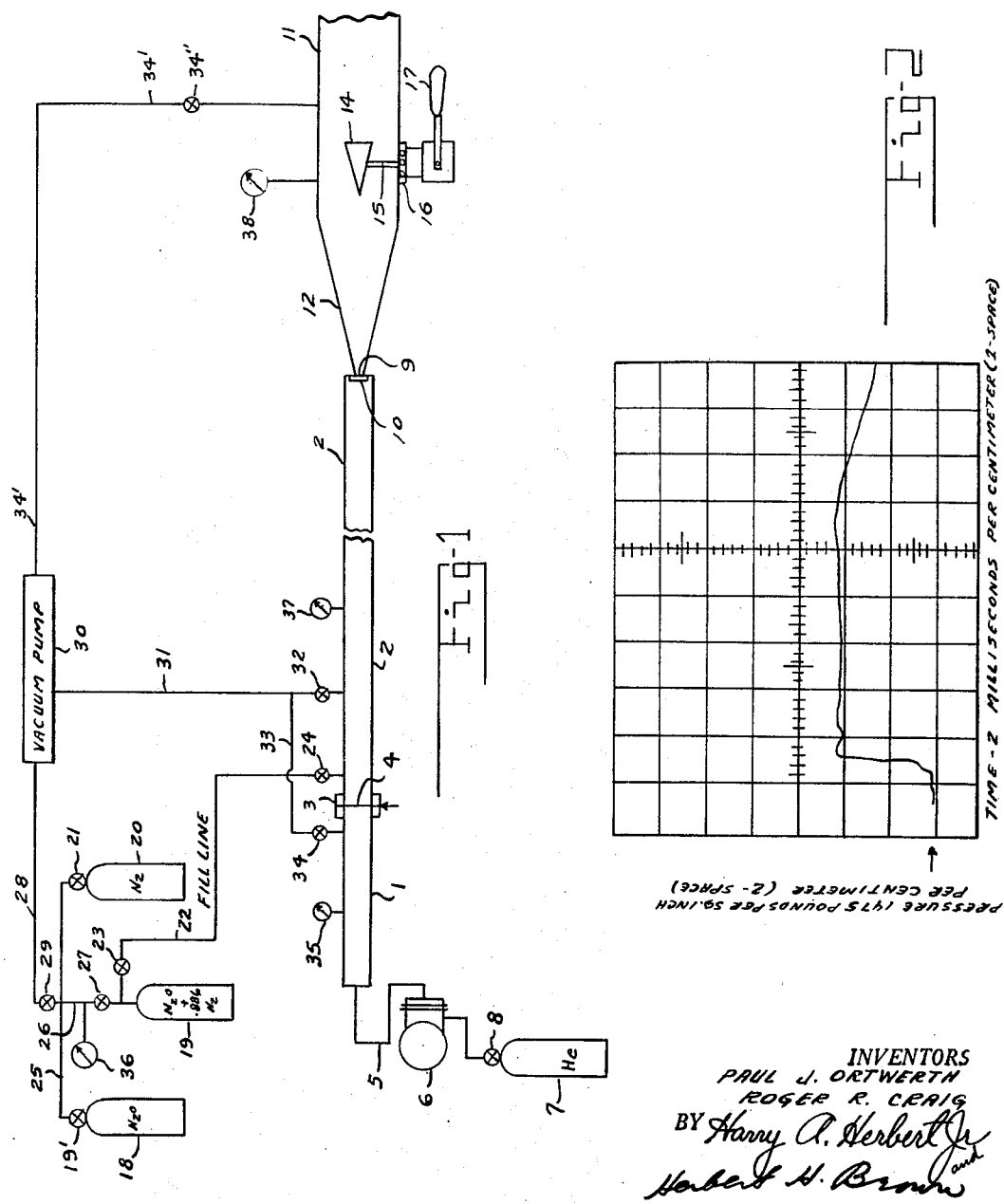

3,505,867
HIGH ENTHALPY AIR FOR HYPERSONIC SHOCK TUNNEL TESTING
Paul J. Ortwerth and Roger R. Craig, Dayton, Ohio, assignors to the United States of America as represented by the Secretary of the Air Force
Filed Jan. 4, 1968, Ser. No. 695,682
Int. Cl. G01m 9/00
U.S. Cl. 73—147                 2 Claims

ABSTRACT OF THE DISCLOSURE

An economical method and apparatus for improving shock-tunnel performance by using room temperature helium in the driver tube and a mixture of one mole of nitrous oxide per .886 mole of nitrogen in the driven tube to produce air at increased stagnation temperatures. The mixture as introduced into the driven section of the shock tunnel has a pressure up to about .43 percent of the desired test stagnation pressure and the helium is introduced into the driver section at about 400 times the mixture pressure in the driven tube.

A diaphragm is positioned between the driver and driven sections of the shock-tunnel. When the diaphragm is ruptured to allow the helium to pass into the driven section, an explosion takes place and the nitrous oxide and nitrogen react to form air at high temperature. The end of the driven tube is closed off except for a relatively small opening through which the reaction air can move into the usual nozzle of a wind tunnel. This opening is temporarily sealed by an easily ruptured disk and the latter, before rupture, causes the column of air to be reflected immediately after the shock. The temperature of the air behind the shock rises sharply to rupture the disk and the air at high enthalpy, and with speed of 4 to 9.5 Mach number enters the wind tunnel to react on the model. The model is tested both aerodynamically and for the heat transfer rate in this manner.

BACKGROUND OF THE INVENTION

This invention relates to high-temperature gaseous streams to be applied to hypersonic wind tunnels for use in aerodynamic testing. The science of gas dynamics for the past decade has been faced with the problem of obtaining high enthalpy gas for introduction into a wind tunnel in order to simulate hypersonic conditions.

The behavior of the aerodynamic models, such as airplanes, also space vehicles and missiles, which must enter and leave the earth's atmosphere at high Mach numbers, can be studied in miniature form within the tunnel. The problem of obtaining an adequate supply of properly conditioned air on an economical basis is indeed difficult. High-powered blowers and electric arc heaters have been employed with some measure of success. But the installation is extremely costly. Its chief advantage lies in the fact that the model can be subjected to fast-moving heated air for extended periods of time to allow exhaustive study of its aerodynamic behavior.

SUMMARY OF THE INVENTION

We have discovered that in many cases, a relatively short test of the model, which may list for only a fraction of a second and subjected to our improved source of high enthalpy air, will supply sufficient data through camera and oscillograph as to reveal some of the more manifest causes of operational failure of the model as well as its aerodynamic stability.

An object of the invention is to provide an inexpensive method and apparatus for presenting a quantity of heated fast-moving air to a wind tunnel.

Another object is to provide an economical source of high enthalpy gas for wind tunnel purposes and which requires a minimum in apparatus and space.

Still another object is to provide a relatively cheap source of high enthalpy air obtained by chemical action and explosive force to impart the necessary heat and velocity to the air.

The above objects are attained in brief by providing a driven tube into which air manufactured by chemical means is forced, and an inert gas under extremely high pressure is introduced into the driver tube which is in line with the driven tube but separated therefrom by a fracturable diaphragm. The pressurized inert gas causes the diaphragm to break which, in turn, produces an explosion and resultant shock wave. The latter generates tremendous heat and pressure values within the driven tube which causes the air mixture to flow into the wind tunnel at a tremendously high velocity and extremely elevated temperatures. The reaction of the model to this moving column of air is evaluated in the usual manner by suitably designed instruments.

Other objects and features will be apparent as the specification is perused in connection with the accompanying drawings.

BRIEF DESCRIPTION OF THE DRAWINGS

FIG. 1 represents a layout of the improved system including a diagrammatic view of the apparatus; and FIG. 2 shows an oscilloscope trace of the reflected shock pressure and the improvement in the time duration of the test in which the model is being subjected to the fast-moving stream of intensely heated air.

DESCRIPTION OF THE PREFERRED EMBODIMENT

Referring to FIG. 1, reference character 1 designates a metal tube or pipe of substantial thickness and of considerable length.

In rectilinearly alignment with the tube 1, there is a similar tube 2 of the same size but preferably of longer length. These two tubes are provided at their contacting ends with flanges indicated at 3, held together by bolts (not shown) to render the joint airtight. A diaphragm which may be constituted of one or more metal plates 4, from ⅛ to ¼" thick depending on the diameter of the tube, extends across the tubes and is held in position by the flanges. The left-hand end (as shown in the figure) of the tube 1 is closed and sealed in any suitable manner except for a central opening from which a pipe 5 extends to a compression pump 6 of any suitable and well-known type. A bottle or tank 7 containing helium at about 2000 p.s.i.a. is connected to the input side of the pump through a control valve 8. The tube 2, closed at its right-hand end (as shown in the figure) with the exception of a small central opening 9, has a plastic sheet or disc 10 hermetically attached. This plastic disc is readily fractured when the air in the driven tube attains its high enthalpy condition.

A wind tunnel of the usual type is indicated at 11 having a conically shaped end 12 of the usual degree of taper and provided with an apertured snoot which heremetically fits over opening 9 in the tube 2.

Within the wind tunnel, there is a model 14, shown as a solid cone member, symbolic of any object, such as a minature airplane or space vehicle, which needs to be tested in a medium of fast-moving, heated air. The model 14 is supported for convenience on a stiff rod 15 which passes downwardly through the tunnel wall at a seal joint. The rod is carried on a set of ball-bearinged plates 16, one of which is adapted to be rotated by the handle 17 in order to orient the model to its optimum position.

The tube 1, which is to the left of the diphragm 4, will be designated at the "driver" gas tube and the tube 2, to the right of the diaphragm, will be called the "driven" gas tube. In addition to the helium bottle 7, three other bottles or containers 18, 19, 20 are employed. Bottle 18 contains nitrous oxide ($N_2O$) at about 800 p.s.i.a. controlled by a valve 19'. Bottle 19 contains a mixture of nitrous oxide ($N_2O$) and an .886 proportion of nitrogen ($N_2$) at about 500 p.s.i.a. Bottle 20 contains nitrogen ($N_2$) at a pressure of about 2000 p.s.i.a. and is controlled by a valve 21. A pipe 22 is connected from the bottle 19 through a control valve 23 to the driven tube 2. This pipe is designated the "fill line." For convenience, an extra control valve 24 is connected in the latter line and is positioned near the driven gas tube. A pipe 25 is connected between the valves 19' and 21 of the respective bottles 18, 20. A pipe 26 connects from the pipe 25 to the bottle 19 through the control valve 27. A pipe 28 is connected from the pipe 25 through the valve 29 to a vacuum pump 30 of any suitable and well-known type. The pump is also connected through a pipe 31 and valve 32 to the driven tube 2. A short length of pipe 33 is connected from the pipe 31 through a valve 34 to the driver gas tube 1. A pipe 34' is also connected between the vacuum pump 30 and the wind tunnel 11 through a control valve 34''. Pressure gauge 35, 36, 37 and 38 are connected respectively to the pipe 1, the pipe 26, the driven tube 2 and the wind tunnel 11.

OPERATION OF THE STRUCTURE AND SYSTEM

Assuming that the bottles 18 and 20 contain pure nitrous oxide ($N_2O$) and pure nitrogen ($N_2$) at the commercially delivered pressures. The first step is to evacuate the bottle 19 to at least 100 microns of mercury. This is accomplished by the pump 30 with the valves 27, 29 open and the valves 19' and 21 closed.

The bottle 19 is then filled with nitrous oxide by closing the valve 29 and opening the valve 19' until the gauge 36 registers about 273 p.s.i.a. The bottle is then filled with nitrogen by closing the valve 19' and opening the valve 21 until the gauge 36 shows about 515 p.s.i.a. final pressure. The valve 27 is then closed. It is preferred that the bottle 19 remain for at least three (3) days for adequate mixing of the nitrogen and nitrous oxide.

The next step is to evacuate the "driven" gas tube 2 to about 100 microns of mercury by operating the vacuum pump 30 and opening the valve 32 connected in line 31. All other valves at this time are closed. The driven gas tube is then filled with the mixture of nitrogen-nitrous oxide from bottle 19 to a pressure of about 22.5 p.s.i.a. as shown on the gauge 37. This is accomplished by closing the valve 32 and opening the valves 23 and 24 connected in the "fill line" 22.

The next step is to fill the driven tube 1 to about 9000 p.s.i.a. with helium as indicated at the gauge 35. To do this, all the valves are closed except valve 8. Since a commercial bottle of helium is furnished at about 2000 p.s.i.a, it is necessary to boost the pressure by the compressor pump 6 up to the required value. Thus the driver gas tube 1 contains helium at approximately 9000 p.s.i.a. and the driven gas tube 2 contains a mixture of nitrous oxide and nitrogen which, on the basis of relative pressures mentioned above, provides a quantity proportion of 1 mole nitrous oxide to .866 mole nitrogen. This is the same nitrogen-oxygen ratio as in air. It will be noted that the shock driver section 1 is loaded with helium to about 400 times the driven gas tube stagnation pressure.

When the pressure of the helium in the tube is increased, approaching the 9000 p.s.i.a. limit, and assuming that the diaphragm 4 is in single form and about 1/8" thick, also that it extends across a tube of about 3" in diameter, the diaphragm will rupture. The helium serves to push the contents of the driven tube toward the disc 10 at considerable speed to initiate a tremendous shock wave in the driven tube. When the shock wave strikes the end plate it is reflected at a greatly enhanced rate of speed which causes a sharp detonation or explosion within the gas mixture to take place in the region of the plastic covering 10. The nitrous oxide and the nitrogen will be caused to violently react to form air and the latter may reach a temperature as high as 3400° R. (Rankine) to 5700° R. depending on the initial pressures of the gases introduced into the driver and driven tubes. In general, as long as the pressure of the helium or other inert gas in the driver gas tube is about 400 times higher than the pressuer of the gas mixture in the driven gas tube, the explosion described above will take place, but the final temperature and the Mach number may change. For example, the driven tube may have only 2.25 p.s.i.a. pressure of mixture in which case the driver tube would have a gas pressure of about 900 p.s.i.a. But in this case the temperature and Mach number brought about by the reflected shock and the explosion would be considerably less, even though still useful, than in the case of the preferred pressures of 22.5 p.s.i.a. and 9000 p.s.i.a. in the respective driven and driver gas tubes mentioned hereinbefore. In any case, the force of the explosion must be such as to rupture the plastic disc 10. This increased stagnation temperature comes from two sources (1) the high tailoring shock Mach number of helium and the nitrous oxide mixture increases the amount of kinetic energy converted into internal energy, and (2) energy is released by the decomposition of the nitrous oxide. After the mixture is shock-heated, the nitrous oxide reaction forms a chemically equilibrium mixture of air. The column of air, being pushed by the column of helium attains supersonic speed, passes through the relatively small opening 9 in the end wall of the driven tube 2 where the air is allowed to expand in passing through the nozzle 12 of the wind tunnel. The column or slug of air will strike the model 14, and the aerodynamic and heat transfer behavior of the model observed or recorded by suitable devices and instruments through a plastic peep hole (not shown) in the wind tunnel. The gases in the tunnel can be exhausted in any suitable manner, for example, by the vacuum pump through the pipe line 34'.

A typical oscilloscopic trace of the reflected shock pressure which gives rise to the supersonic speed and high enthalpy of the gas is shown in FIG. 2. The abscissa of the graph is spaced off in 2 milliseconds per centimeter (one space); the ordinate represents pressure and each space represents 1475 pounds per square inch absolute per centimeter. The Mach number in this particular test is 4.68 or more than four times the speed of sound. It will be noted that the actual stagnation pressure in the shock tunnel (driven gas tube 1) approached 3150 pounds per square inch (absolute) and this pressure is held for a period of 11 milliseconds. This time period, while seemingly small, is still sufficiently long to provide a blast off air having high enthalpy which passes the model 14 at a high Mach number in order to simulate actual operating conditions. This Mach number can be controlled by the relative gas pressures in the tubes 1 and 2. The nozzle 12 of the wind tunnel also serves to enhance the speed of the moving air as it reaches the model. During the 11 milliseconds time interval, when the stagnation pressure remains at about 3150 p.s.i.a., this time period, even though relatively short, is still long enough to uncover the more important weaknesses of the full size counterpart of the model, and also to forecast its aeronautical behavior when operated, full size, under practical operating conditions.

The apparatus employed, consisting mainly of the driver and driven gas tubes, also the supply of the three types of gas, is almost insignificant in cost as compared with a continuous blower type of air supply. Yet, in many cases, the presently improved apparatus gives results which, while not replete with the fine detail of the blower tunnel type, nevertheless are extremely useful in arriving at the optimum design of an airplane or a space vehicle including their aeronautical and heat transfer behavior when traveling through air of high enthalpy at supersonic speeds.

While a certain specific embodiment has been described, it is obvious that numerous changes may be made without departing from the general principles and scope of the invention.

We claim:

1. Shock tunnel apparatus for supplying a wind tunnel with air having high enthalpy and supersonic speed, said apparatus including an elongated cylindrical tube having a rupturable diaphragm extending across the tube intermediate of its ends to form a driver gas compartment and a separable driven gas compartment, the outer end of the driver gas compartment being closed except for an opening for receiving a gas under pressure, the outer end of the driven gas tube being closed except for an opening at the center, through which the gas content of the driven gas tube can be expelled to pass into a wind tunnel, a temporary closure for the last mentioned opening, means for charging the driven gas compartment with two gases and which when caused to combine produce a body of air, and means for charging the driven gas compartment with an inert gas at a pressure sufficiently high to break said rupturable diaphragm whereby said last mentioned gas is caused to enter the driven gas compartment to set up a shock wave which causes an explosion to chemically combine the said two gasses in the last mentioned compartment whereby air is formed, said explosion causing said temporary closure to rupture whereby air of high enthalpy and supersonic speed is permitted to travel through the aforesaid opening into the wind tunnel, the said two gases in the driven gas compartment being constituted of nitrous oxide and nitrogen, present in the proportion of one mole of nitrous oxide to .886 mole of nitrogen, and the inert gas in the driven gas compartment consists of helium.

2. Shock-tunnel apparatus for supplying a wind tunnel with air at high enthalpy and supersonic speed according to claim 1 and in which the nitrous oxide and nitrogen mixture is introduced into the driven gas compartment at about 22.5 p.s.i.a. and the helium is introduced into the driver gas compartment at about 9000 p.s.i.a and the resulting explosion causes a stagnation pressure in the driven gas compartment of approximately 2150 p.s.i.a. and a shock Mach number greater than 4.

References Cited

UNITED STATES PATENTS

| | | | |
|---|---|---|---|
| 2,799,159 | 7/1957 | Sabol | 73—147 |
| 3,019,621 | 2/1962 | Lawson | 73—147 XR |
| 3,184,097 | 5/1965 | Kilmer et al. | 73—147 XR |
| 3,191,435 | 6/1965 | Weller | 73—147 |
| 3,260,103 | 7/1966 | Johnson | 73—12 |
| 3,300,283 | 1/1967 | Lauer et al. | 23—284 |
| 3,407,653 | 10/1968 | Harp | 73—147 |

OTHER REFERENCES

Howard B. Palmer, Introduction to Shock Tube Chemistry, In Analytical Chemistry, vol. 39, No. 14, December, 1967, pp. 28A–30A, 32A, 35A–39A.

S. CLEMENT SWISHER, Primary Examiner